Jan. 22, 1929.                                                              1,699,558
H. W. AINSWORTH ET AL
DEPTH AND CONTENTS GAUGE FOR SILOS, TANKS, AND CISTERNS
Filed April 8, 1927
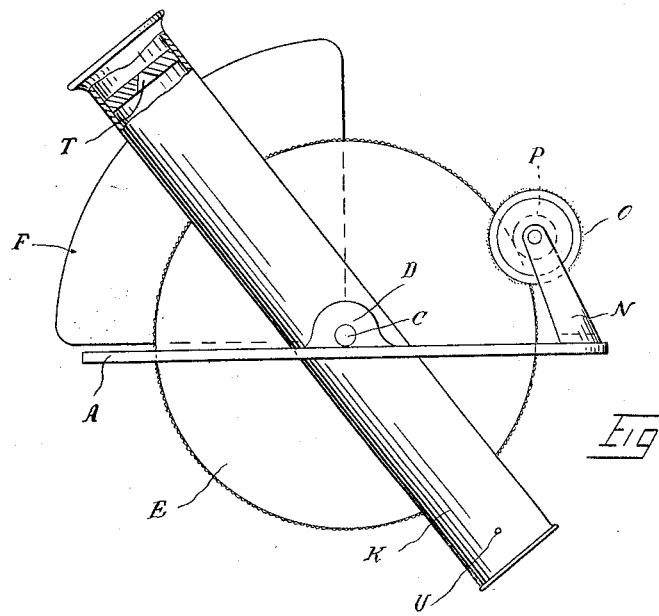
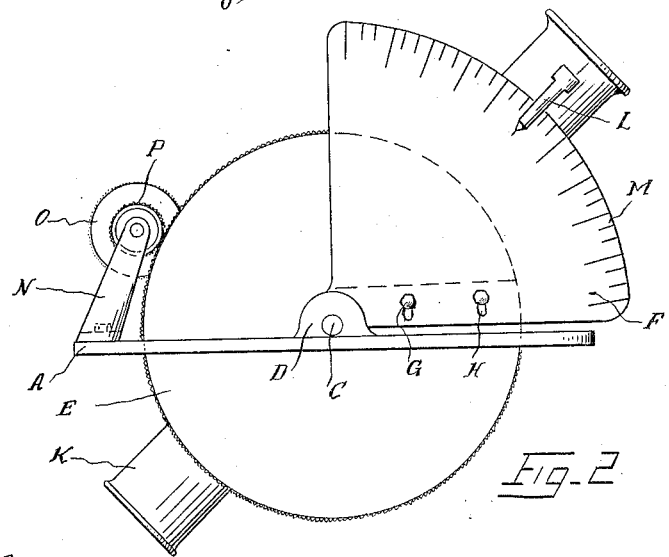
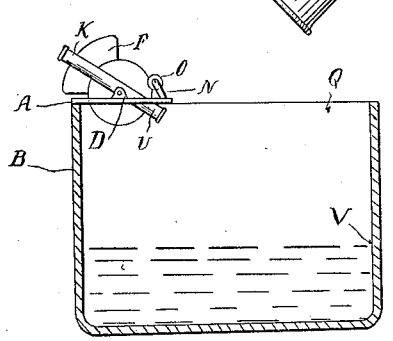
Harry Whitfield Ainsworth
Alva Charles Likely
Leslie Boardman
INVENTORS
By
their Attorney Patented Jan. 22, 1929.

1,699,558

UNITED STATES PATENT OFFICE.

HARRY WHITFIELD AINSWORTH, OF CROYDON, NEAR SYDNEY; ALVA CHARLES LIKELY, OF GREENWICH, NEAR SYDNEY; AND LESLIE BOARDMAN, OF VAUCLUSE, NEAR SYDNEY, AUSTRALIA.

DEPTH AND CONTENTS GAUGE FOR SILOS, TANKS, AND CISTERNS.

Application filed April 8, 1927, Serial No. 181,972, and in Australia December 12, 1926.

This invention relates to gauges for ascertaining the surface level of grain in silos and water and other liquids in bulk tanks and cisterns and for indicating the volume contained in them. It consists in an inclinometer with marked dials and with means for fixing it on the top of the vessel so as to facilitate observation of the level of the surface of the contents at one side of the vessel, and with means for adjusting it to ensure correct readings.

In the accompanying drawings:—

Figs. 1 and 2 are respectively elevational views of either side of the instrument; and Fig. 3 is a semi-diagrammatic sectional elevation showing the instrument set up on a cistern.

A is a base plate adapted to be set upon and if necessary clamped or otherwise fixed to the top edge of one side B of a silo tank cistern or other container Q. D are trunnion bearings on the plate A, and C trunnions carried in the bearings D. E is a disc with fine toothed edge, and F a sector plate; the disc E and plate F are carried by the trunnions C, and the plate F is adjustable in relation to the disc E by bolts or screws G working in slotted holes H; the bolts or screws G bind the sector to the disc when their relative positions are adjusted. The sighting barrel K is fitted with trunnions C on which it may be swung so as to traverse the pointer L which it carries over the graduated dial quadrant M on the edge of the sector plate F. T is a central peep hole in a diaphragm near the top end of the barrel K, and U is a hairline stretched across the barrel K near its bottom end. N is a bracket fixed on the base plate A and carrying a milled wheel O which has a fine toothed pinion P fixed to one side of it; this pinion meshes with the toothing on the edge of the disc E.

The instrument is fixed on the top of a container Q or on a fixture above the container Q so that the line of contact at V of the contents level with a distant side of the container may be sighted when the inclination of the barrel K is adjusted appropriately.

The quadrant scale M is marked for the particular container on which the instrument is used, the depth contents being calculated or measured for the purpose. A sighting observation of the line V through the barrel brings the pointer L to the graduation position on the scale M from which the depth and volume of the contents may be read off directly. Exactness of adjustment is attained by manipulating the milled wheel.

What we claim as our invention and desire to secure by Letters Patent is:—

A depth and volume measuring attachment consisting of an inclinometer sighting barrel trunnion mounted on a base plate which is adapted to be fixed on or above a silo, tank, or cistern, a graduated quadrant, a pointer carried by said barrel and arranged to move over a graduated quadrant when the barrel is tipped, and means for adjusting the quadrant in relation to the base plate, substantially as described.

In testimony whereof we affix our signatures.

HARRY WHITFIELD AINSWORTH.
ALVA CHARLES LIKELY.
LESLIE BOARDMAN.